(12) United States Patent
Gonzalez-Moratiel Alvarez

(10) Patent No.: US 11,913,442 B2
(45) Date of Patent: Feb. 27, 2024

(54) LOW PRESSURE STARTER DEVICE FOR PNEUMATIC PUMPS

(71) Applicant: SAMOA INDUSTRIAL, S.A., Gijon (ES)

(72) Inventor: Alberto Gonzalez-Moratiel Alvarez, Madrid (ES)

(73) Assignee: SAMOA INDUSTRIAL, S.A., Gijon (ES)

( * ) Notice: Subject to any disclaimer, the term of this patent is extended or adjusted under 35 U.S.C. 154(b) by 215 days.

(21) Appl. No.: 17/423,696

(22) PCT Filed: Jan. 20, 2020

(86) PCT No.: PCT/IB2020/050409
§ 371 (c)(1),
(2) Date: Jul. 16, 2021

(87) PCT Pub. No.: WO2020/152565
PCT Pub. Date: Jul. 30, 2020

(65) Prior Publication Data
US 2022/0082095 A1    Mar. 17, 2022

(51) Int. Cl.
F04B 43/00 (2006.01)
F04B 9/12 (2006.01)
F04B 43/073 (2006.01)
F16K 11/052 (2006.01)

(52) U.S. Cl.
CPC ............ F04B 43/0081 (2013.01); F04B 9/12 (2013.01); F04B 43/0736 (2013.01); F16K 11/0525 (2013.01)

(58) Field of Classification Search
CPC ................ F04B 43/0081; F04B 43/073; F04B 43/0736; F04B 9/12; F04B 45/053; F16K 11/0525

USPC ......................................................... 417/395
See application file for complete search history.

(56) References Cited

U.S. PATENT DOCUMENTS

| 3,405,642 | A  | * | 10/1968 | Freeman ................. F04B 49/24 417/399 |
|---|---|---|---|---|
| 6,419,463 | B1 |  | 7/2002 | Bahrton |
| 6,422,834 | B1 |  | 7/2002 | Bahrton |
| 6,644,940 | B2 |  | 11/2003 | Yamada |
| 8,858,195 | B2 |  | 10/2014 | Gonzalez-Moratiel Alvarez |
| 2002/0076340 | A1 |  | 6/2002 | Yamada |
| 2013/0115117 | A1 |  | 5/2013 | Gonzalez-Moratiel Alvarez |

FOREIGN PATENT DOCUMENTS

EP    0524820    1/1993

OTHER PUBLICATIONS

International Search Report for PCT/IB2020/050409 dated Apr. 30, 2020.

\* cited by examiner

*Primary Examiner* — Kenneth J Hansen
(74) *Attorney, Agent, or Firm* — B. Aaron Schulman, Esq.; Stites & Harbison, PLLC

(57) ABSTRACT

The invention relates to a low-pressure starter device for pneumatic pumps with a pivoting directional air-control valve, characterised in that the low-pressure starter system consists of a retractable push piston actuated by a variable-tension spring that exerts pressure on the shaft of a pivoting element of the body of the directional valve, during start-up, in an end operating positions, said device being formed by a retractable piston, a sealing gasket, a spring and a spring stop.

6 Claims, 6 Drawing Sheets

LOW PRESSURE STARTER DEVICE FOR PNEUMATIC PUMPS

DESCRIPTION OF THE SUBJECT MATTER OF THE INVENTION

The present invention refers to a low pressure starting device for pneumatic pumps with a pivoting directional air control valve which uses a low pressure starting system consisting of a piston driven by a variable tension spring which exerts force on the shaft of the pivoting element of the directional valve body, during start-up, in one of the operating positions at either end. It is used to control the operation of a double diaphragm pump or pneumatic piston pump. The main body of the directional valve has inlet and outlet ports. The pivot element is placed inside the directional valve and moves freely between the two limit positions and has two surfaces that adapt to close the air ports in either the two end positions. Once the pivoting directional control valve is set in motion to control the diaphragm or piston pump, the low-pressure starting system is retracted by the double diaphragm or piston pump's own operating pressure. The operation of the pivoting directional control valve also requires the use of pneumatic pilot sensors that detect the limit positions of the diaphragms of the double diaphragm pump to allow the reversal of the movement of the pivoting directional control valve itself.

FIELD OF APPLICATION THE INVENTION

This invention has its application within the sector of the pneumatic pump industry for the transfer of fluids and/or fluids containing solids or particles in suspension and/or powders and/or fluids which are chemically aggressive or difficult to handle, such as hydrocarbons, chlorinated hydrocarbons, acids, bases and other chemical products used in industrial processes.

BACKGROUND TO THE INVENTION

There are many pneumatic double diaphragm or piston pumps on the market driven by air motors that control the reciprocating motion of the pumps for normal operation. Air motors can take various forms and generally consist of an air steering device or slide although a pivoting drive can also be used instead. The present invention has its application in air motors for driving pneumatic devices which have a pivoting drive element. In these cases, to improve the start-up of devices controlled at very low pressures, the low-pressure start-up system described in this patent will be used.

The applicant company holds Patent No. ES20100000633 (PCT/ES2011/000162) for a central flow double diaphragm pump with a low friction pivoting directional spoiler valve, however, the present invention is a substantial improvement to the starting system of the aforementioned low-pressure pumps. It is not known of any type of pneumatically operated motor with a pivoting device incorporating a low-pressure starting device consisting of a piston driven by a spring of variable force and which allows the device to start at low pressures and retract automatically when the set normal operating pressure is reached.

DESCRIPTION OF THE INVENTION

For the description of the present invention, the following terminology is used and is confirmed to be commonly accepted in the field to which it refers. The meaning of each piece of terminology is given below for the purposes of its understanding.

AIR/COMPRESSED AIR=compressed air or any other driving fluid.
FLUID=pumped material which could be a liquid, a liquid with suspended particles, or air with suspended dust.
PIVOTING VALVE=pivoting directional valve with a replaceable inlet and
outlet
drum
LSD=Low Start Device The present invention consists of a special design of the pneumatically driven air motor equipped with a pivoting valve which works via the introduction of a piston thrust device which allows the starting of the pump which it controls to take place even with very low pressure.

The low pressure starting device (3) consists of the following elements:
Main thrust piston with its sealing ring (3.4)
Spring (may be an elastomer)
Spring stop (3.3)

This device is located in the air motor chamber for driving double diaphragm or piston pneumatic pumps, where the pivoting valve is housed. Its function is to distribute the compressed air to the two chambers of the pump to produce its alternating movement, the present invention provides a low pressure starting device comprising of a piston, a sealing ring (3.4), a spring and a spring stop (3.3) which hold the pivoting valve in its starting position until the required minimum starting pressure is reached. Once this minimum starting pressure is reached, the low-pressure starter system is pulled back against the spring pressure and held in this position due to the working pressure in the chamber until the air motor pressure is released due to the air motor being switched off, at which point the air motor returns to its starting position.

The push piston is positioned so that the end of the main push piston strikes the pivot valve at its inlet arm in such a way that it holds it in the initial start position, even if the system is not pressurised. The point of contact on the pivoting valve shall be such that the force exerted by the piston spring allows the pivoting valve to be held in the standby position regardless of the state of the air motor.

Once the air pressure is allowed into the air motor through the motor inlet and once it reaches the set start pressure, the air pressure exerts a force on the LSD piston which causes it to pull backwards eliminating the support it had on the pivot valve. At this point the working pressure is reached and the pivoting valve starts to work without being disturbed by the LSD thrust piston and sends air alternately to both chambers through the air inlet ports.

Once the air pressure is lost due to the device stopping, the pressure in the inlet chamber of the air motor disappears and the LSD piston is automatically pushed by a spring or by any pressure system used for this purpose, it returns to its initial position by pushing the pivoting valve and holding it in its starting standby position ready to start the work cycle again.

DESCRIPTION OF THE DRAWINGS

In order to supplement the description herein and to assist in a better understanding of the features of the invention, a set of drawings is attached hereto as an integral part of the description, which illustratively and non-limitingly depicts the following.

PREFERRED IMPLEMENTATION OF THE INVENTION

Figure 1A:
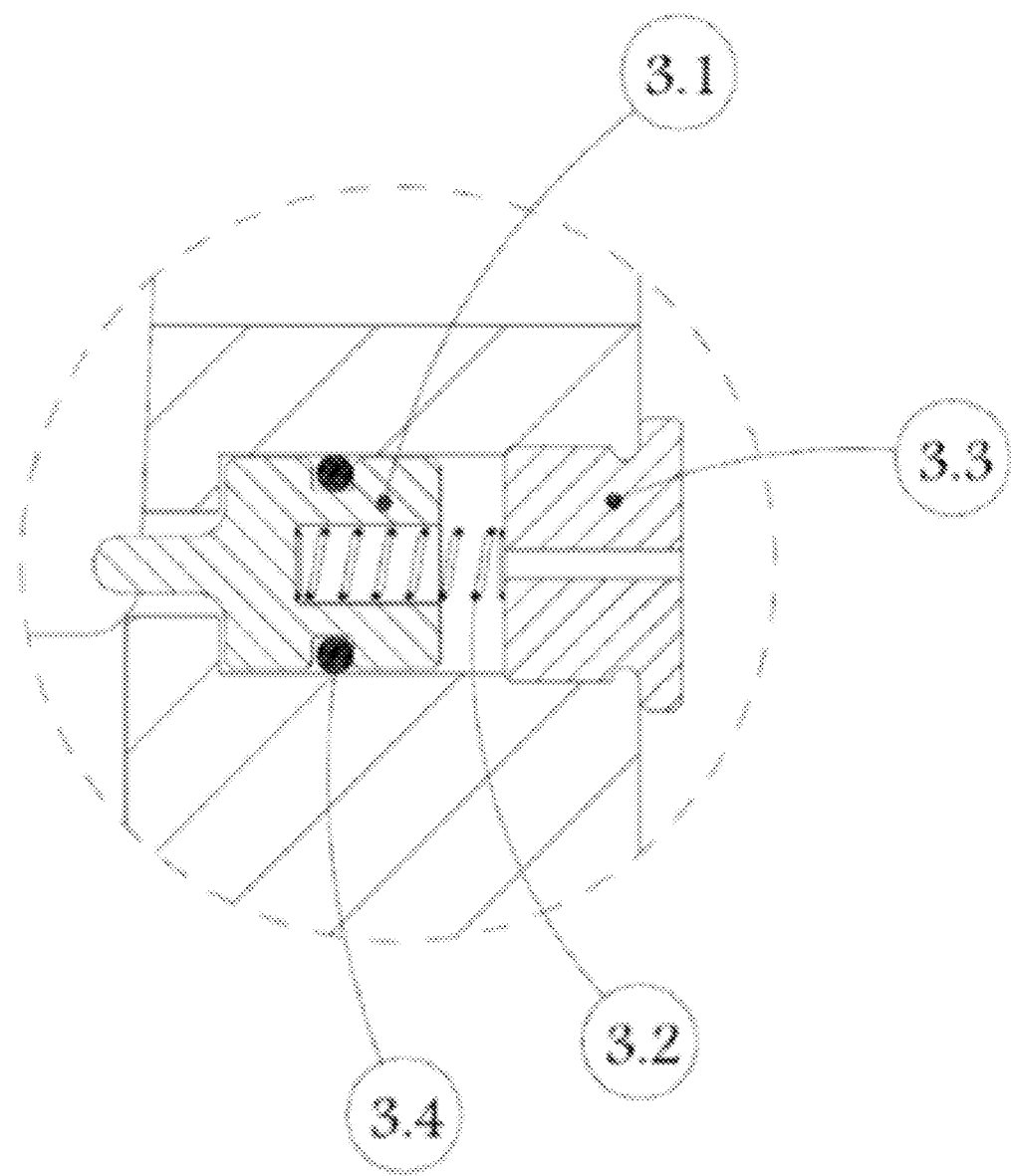
FIGS. 1a and 1b.—These figures provide sectional views of the retractable push piston in its exhaust position with a schematic of its interior.
Figure 1B:
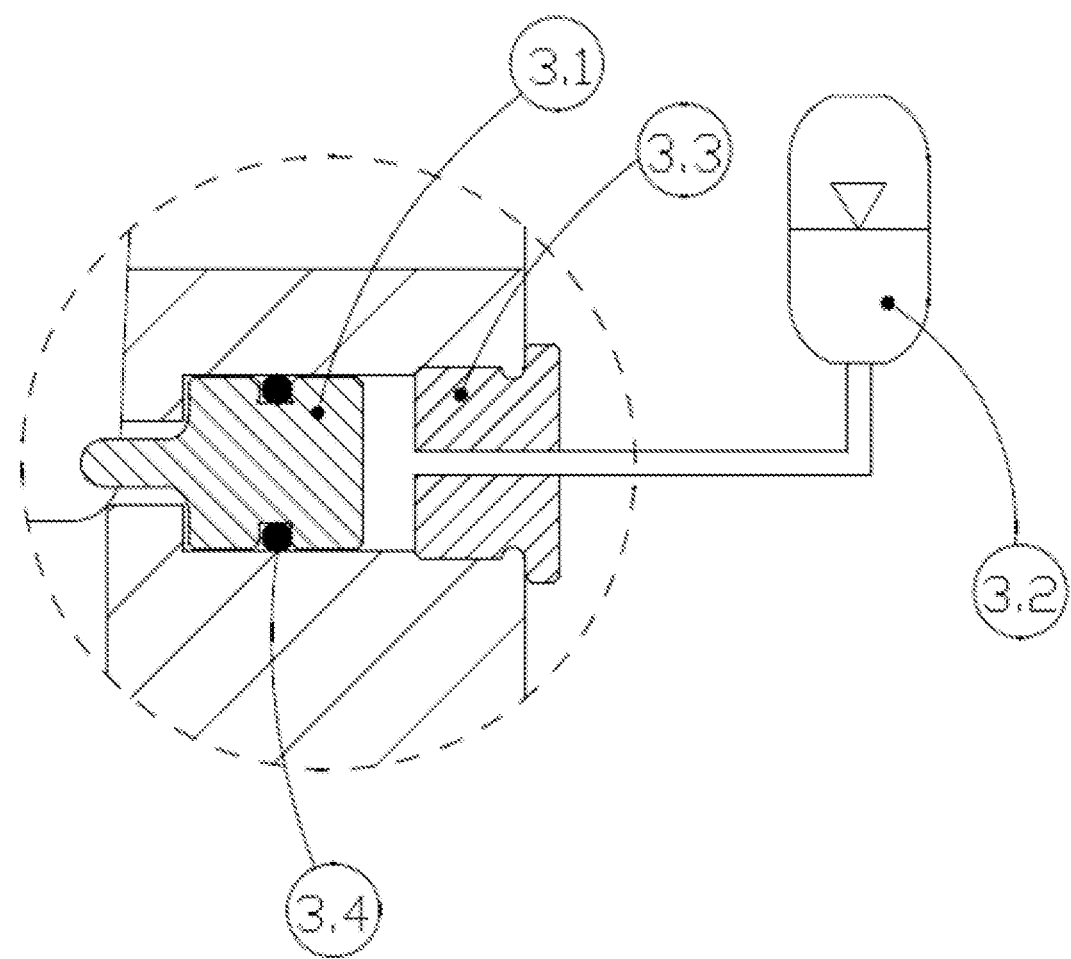
Figure 2:
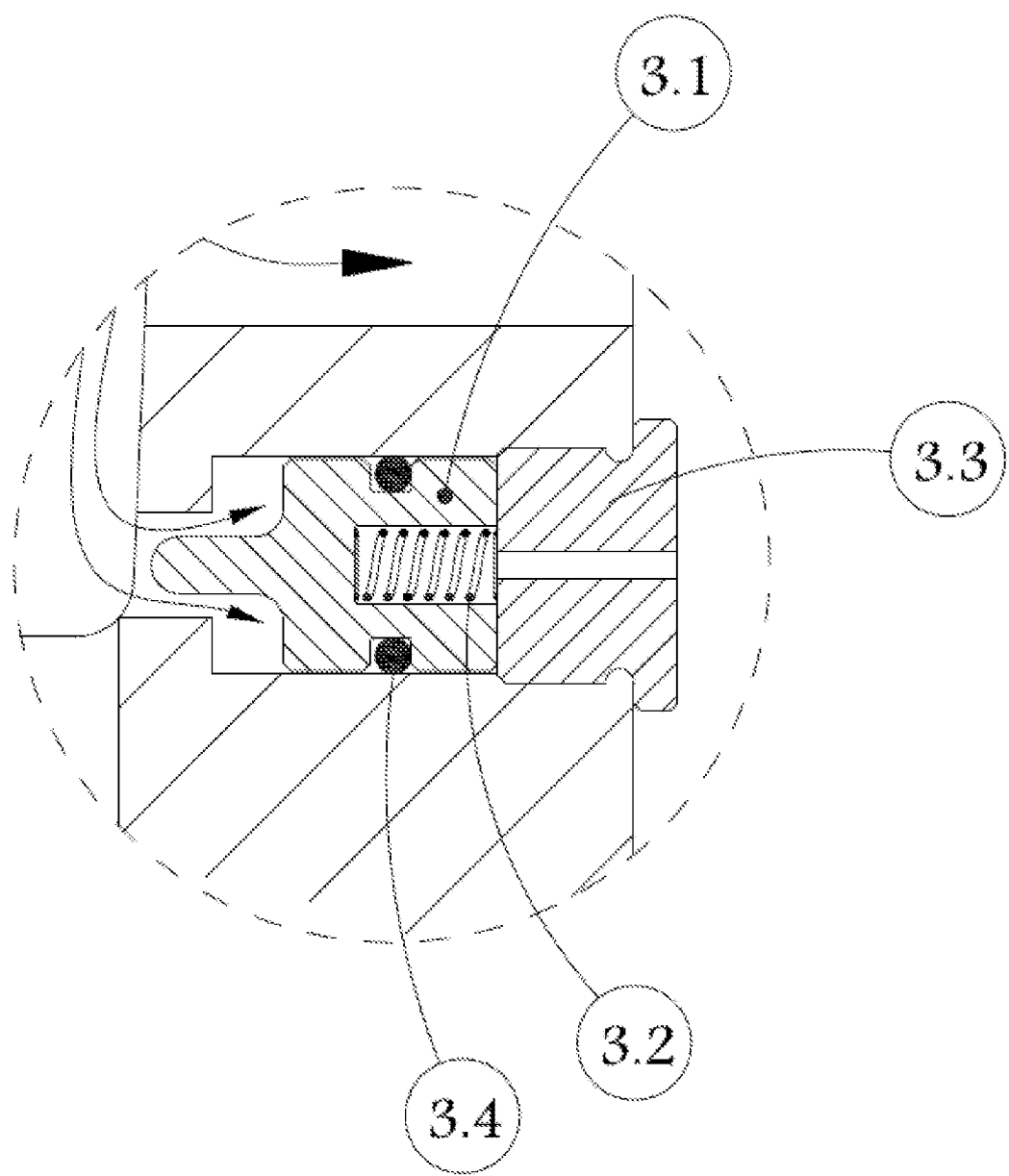
FIG. 2.—A sectional view of the push piston in its compression position.
Figure 3:
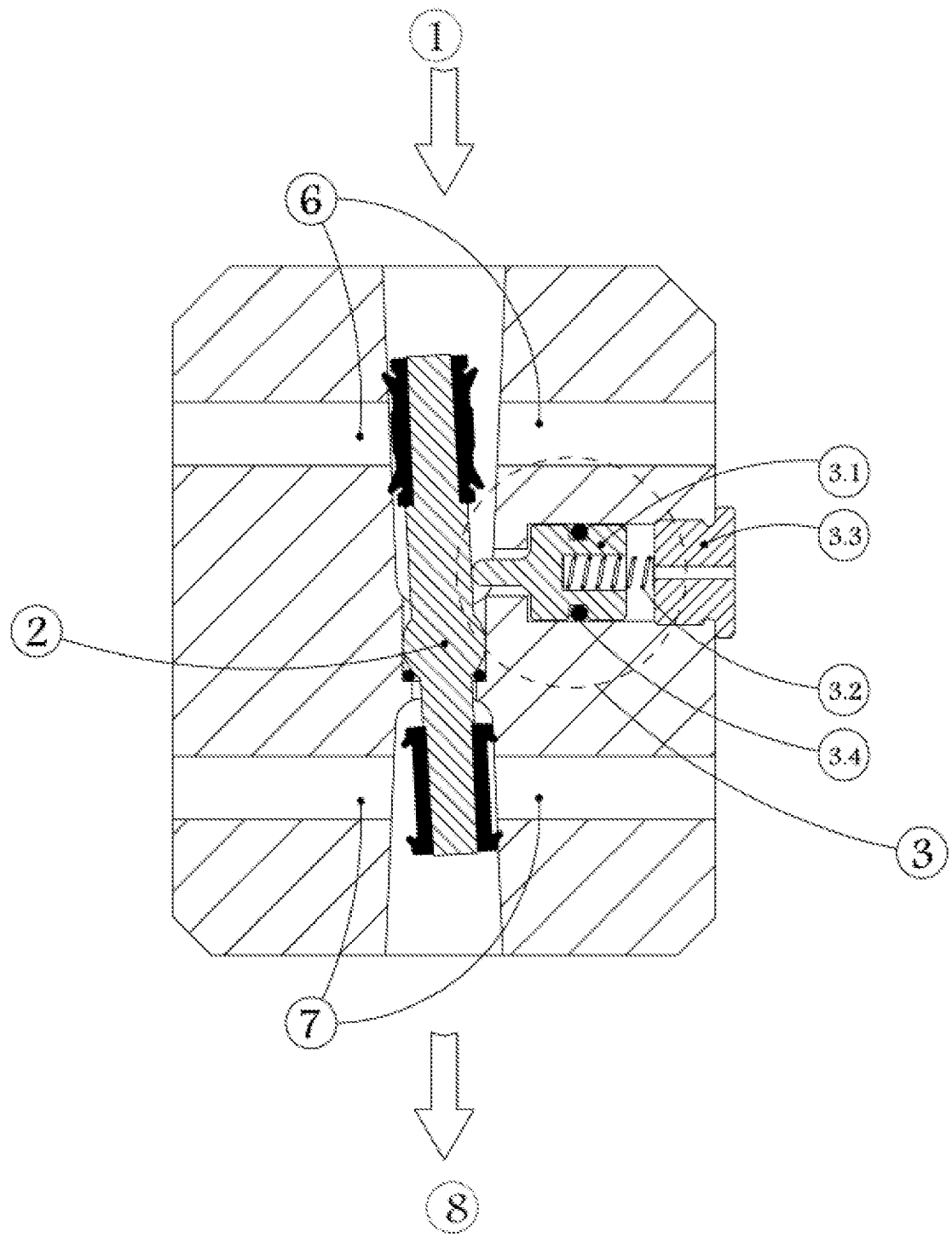
FIG. 3.—A schematic diagram of the interior of the air motor with a pivoting valve and LSD with its push piston in the exhaust position.
Figure 4:
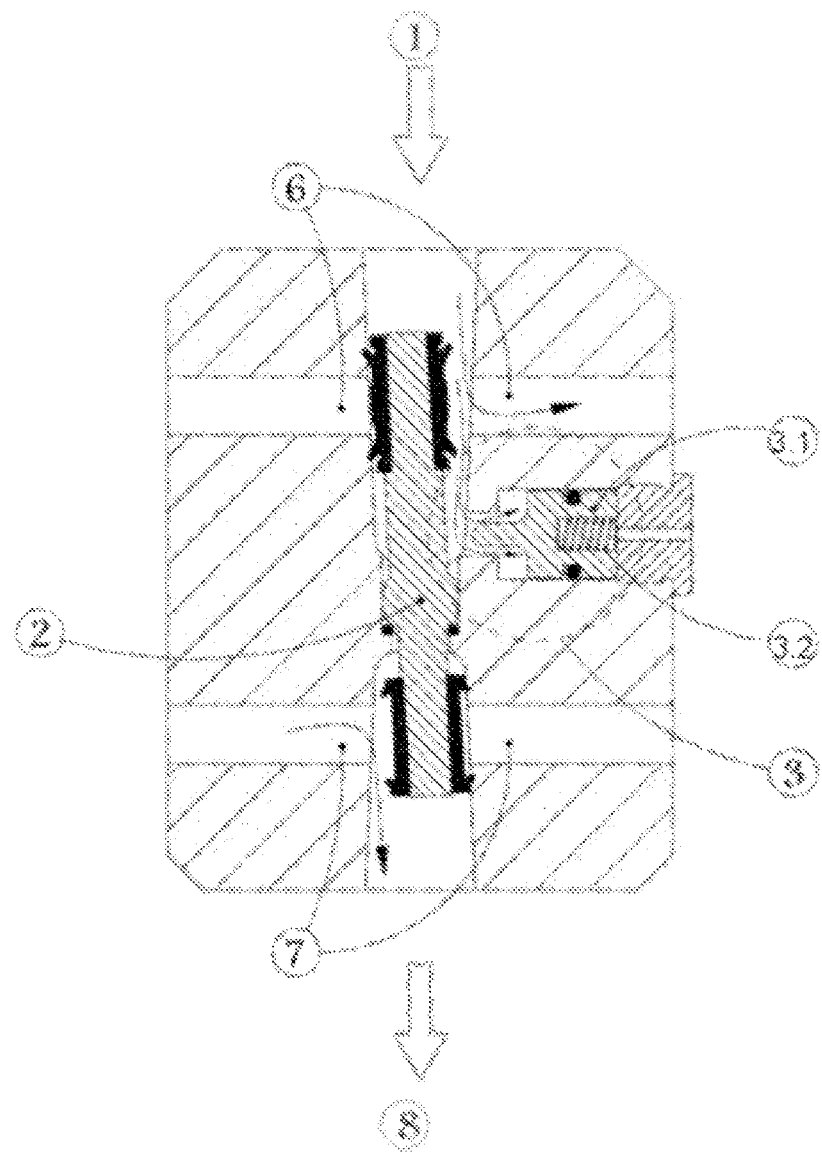
FIG. 4.—A schematic diagram of the interior of the air motor with a pivoting valve and LSD with its push piston in the compression position.
Figure 5:
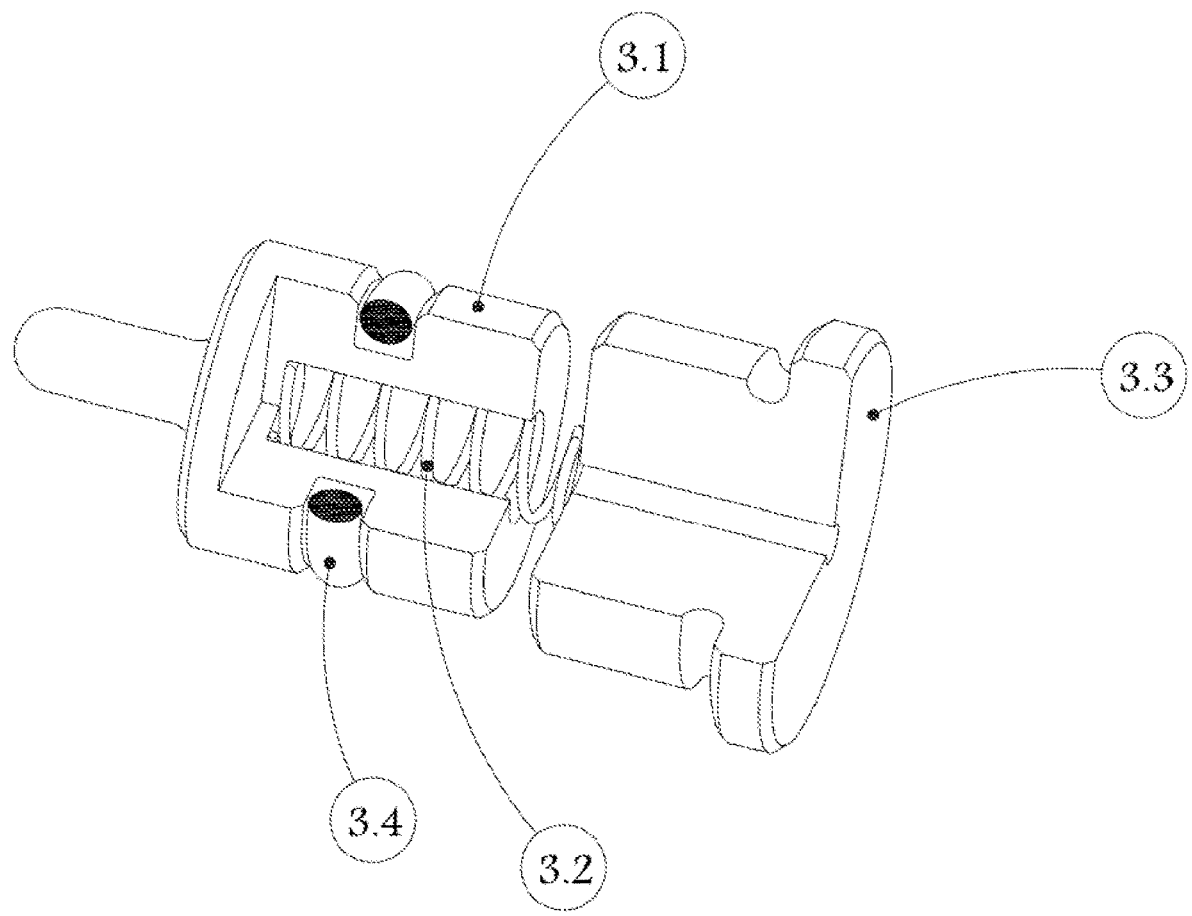
FIG. 5.—A cross section view of the push piston is shown.

The operation of the low pressure starting device for pneumatic pumps takes place through the interaction of the following pump components using the air pressure which is fed into the motor via the air motor inlet (1). This pressure acts on the pivoting valve (2) and on the LSD's (3) retractable push piston (3.1). When the pressure reaches the set minimum start value the piston retracts backwards (FIG. 2) due to the action of the compressed air and separates from the free-moving pivoting valve (2). The spring (3.2) is compressed and loaded to produce the discharge of force when the pressure inside the air motor is no longer active. The retracting piston (as shown in Figure 1b) can also be operated by means of air or pressurised hydraulic fluid instead of the spring 3.2.

When the motor is running the compressed air passes alternately through the air inlet ports (6) and, after passing through the inside of the controlling diaphragm or piston pump, it leaves the air motor through the air outlet ports (7) alternately in the direction of the air motor outlet (8).

Once the air pressure is removed due to the stoppage of the device, the pressure in the inlet chamber of the air motor disappears and the LSD piston automatically pushed by the spring or by any pressure system used for this purpose, returns to its initial position pushing the pivoting valve and keeping it in its starting standby position ready to start again with the working cycle.

The valve can have a different actuating fluid other than compressed air, but can still be used to actuate pneumatic devices such as pneumatic double diaphragm pumps or piston pumps.

The invention claimed is:

1. A low pressure starting device for pneumatic pump with a pivoting directional air control valve, said low pressure starting device comprising:
a retractable push piston driven by a variable tension spring which presses on the pivoting directional air control valve, during start-up, and in start position;
a sealing gasket; and
a spring stop;
wherein said low pressure starting device is driven by an electronic pressure control system which allows starting pressure to be varied automatically, and
wherein the spring stop holds the pivoting directional air control valve in its start position until it reaches a required minimum start pressure, and once the required minimum starting pressure is reached, the low pressure starting device pulls back against spring pressure and remains in this position until pressure in the pivoting directional air control valve is released when an air motor is shut down, at which time said pivoting directional air control valve returns to its start position.

2. The low pressure starting device pivoting directional air control valve of claim 1 wherein said low pressure starting device further comprises a driving fluid other than compressed air.

3. The low pressure starting device of claim 1 wherein elastic action of the variable tension spring is obtained by using an elastomer whose elastic properties allow the retractable push piston to be operated.

4. The low pressure starting device of claim 1 wherein the retractable push piston is operated by air or pressurised hydraulic fluid instead of the variable tension spring.
wherein both drums are replaceable.

5. The low pressure starting device of claim 1, wherein driving fluid is capable of driving pneumatic devices selected from the group consisting of double diaphragm pneumatic pumps and piston pumps.

6. A low pressure starting device for a pneumatic pump, said low pressure starting device comprising:
a pivoting directional air control valve;
a retractable push piston driven by a variable tension spring which presses on the pivoting directional air control valve during start-up, and in start position;
a sealing gasket; and
a spring stop;
herein the pivoting
wherein the pivoting directional air control valve comprises an inlet drum and an outlet drum that distribute compressed air to pump chambers of the pneumatic pump so that said pump chambers are driven alternately; and
wherein both drums are replaceable.

* * * * *